United States Patent
Hao et al.

(10) Patent No.: US 9,759,619 B2
(45) Date of Patent: Sep. 12, 2017

(54) PRESSURE SENSITIVE FILM AND MANUFACTURING METHOD THEREOF

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Xian Hao, Beijing (CN); Yu Liu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/085,387

(22) Filed: Mar. 30, 2016

(65) Prior Publication Data

US 2016/0299018 A1    Oct. 13, 2016

(30) Foreign Application Priority Data

Apr. 8, 2015  (CN) .......................... 2015 1 0163546

(51) Int. Cl.
  *G01L 1/02*    (2006.01)
  *G01L 1/24*    (2006.01)
  (Continued)

(52) U.S. Cl.
  CPC ................ *G01L 1/247* (2013.01); *B32B 3/18* (2013.01); *B32B 27/06* (2013.01); *B32B 27/36* (2013.01);
  (Continued)

(58) Field of Classification Search
  CPC  G01L 1/247; B32B 3/18; B32B 27/06; B32B 27/36; B32B 37/144; B32B 2307/404; B32B 2307/51; B32B 2367/00
  (Continued)

(56) References Cited

U.S. PATENT DOCUMENTS 6,462,859 B1 * 10/2002 Bastiaens ............. G02B 26/026
                                                                    345/107
6,839,158 B2 *  1/2005 Albert .................. G02B 26/026
                                                                    345/107
(Continued)

FOREIGN PATENT DOCUMENTS

CN    1224851    8/1999
CN    1383198    12/2002
(Continued)

OTHER PUBLICATIONS

Chinese Office Action from corresponding Chinese Application No. 201510163546.3, Aug. 12, 2016, 7 pages.

*Primary Examiner* — Max Noori
(74) *Attorney, Agent, or Firm* — Harness, Dickey & Pierce, P.L.C.

(57) ABSTRACT

The present disclosure relates to the display technical field, more particularly, to a pressure sensitive film and a manufacturing method thereof. The pressure sensitive film comprises a substrate, a color displaying layer and a color forming layer laminated sequentially; the other surface of the substrate opposite to the surface adjoining the color displaying layer is for bearing pressure; the color forming layer comprises at least one color forming unit, each of which comprises at least two color sacs, and the at least two color sacs have pressure-bearing thresholds different from each other, and operate when the pressure borne reaches their pressure-bearing thresholds; the color displaying layer displays corresponding colors according to the operation (Continued)

conditions of the color sacs, and each color corresponds to a set pressure value. The pressure sensitive film provided by the present disclosure determines a pressure range of the device according to the different colors, realizing effective monitoring of the device pressure; and determining the flatness of the device according to the evenness of the colors of tested regions, thus combining the pressure test and flatness test, so as to make the routine device pressure monitoring more convenient.

18 Claims, 2 Drawing Sheets

(51) Int. Cl.
  *B32B 3/18* (2006.01)
  *B32B 27/06* (2006.01)
  *B32B 27/36* (2006.01)
  *B32B 37/14* (2006.01)

(52) U.S. Cl.
  CPC ...... *B32B 37/144* (2013.01); *B32B 2307/404* (2013.01); *B32B 2307/51* (2013.01); *B32B 2367/00* (2013.01)

(58) Field of Classification Search
  USPC .................................................. 73/760, 581
  See application file for complete search history.

(56) References Cited

U.S. PATENT DOCUMENTS

| 8,125,465 B2 * | 2/2012 | Lin | G06F 3/044 |
| | | | 178/18.07 |
| 8,610,999 B2 * | 12/2013 | Hsieh | G02F 1/167 |
| | | | 204/450 |
| 2007/0266901 A1 * | 11/2007 | Rance | C08L 3/02 |
| | | | 106/501.1 |

FOREIGN PATENT DOCUMENTS

| CN | 202805823 | 3/2013 |
| CN | 103335748 | 10/2013 |

* cited by examiner

US 9,759,619 B2

PRESSURE SENSITIVE FILM AND MANUFACTURING METHOD THEREOF

CROSS-REFERENCE TO RELATED APPLICATION

This application claims the benefit and priority of Chinese Patent Application 201510163546.3 filed Apr. 8, 2015. The entire disclosure of the above application is incorporated herein by reference.

FIELD

The present disclosure relates to the display technical field, and particularly to a pressure sensitive film and a manufacturing method thereof.

BACKGROUND

This section provides background information related to the present disclosure which is not necessarily prior art.

During manufacturing processes, device pressure and flatness need to be monitored daily. Usually a pressure tester is used to test the pressure. However, this kind of pressure testing method has a complicated testing process, and the operation is inconvenient, not suitable for everyday monitoring of device pressure. Moreover, the flatness of the tested device is usually detected by a traditional pressure sensitive film. However, the pressure sensitive film is not sensitive to the pressure values, and cannot be used to monitor the device pressure.

SUMMARY

This section provides a general summary of the disclosure, and is not a comprehensive disclosure of its full scope or all of its features.

(I) Technical Problem to be Solved

The present disclosure intends to solve the technical problem of providing a pressure sensitive film and a manufacturing method thereof, to overcome the defects in the prior art that two different devices are required to detect the device pressure and flatness, and the detection effects of the two devices are not accurate.

(II) Technical Contents

In order to solve the above technical problem, the present disclosure provides a pressure sensitive film, comprising a substrate, a color displaying layer and a color forming layer laminated sequentially;

the other surface of the substrate opposite to the surface adjoining the color displaying layer is for bearing pressure;

the color forming layer comprises at least one color forming unit, each of which comprises at least two color sacs, and the at least two color sacs have pressure-bearing thresholds different from each other, and operate when the pressure borne reaches their respective pressure-bearing thresholds;

the color displaying layer displays corresponding colors according to the operation conditions of the color sacs, and each color corresponds to a set pressure value.

Optionally, the substrate is an elastic base film.

Optionally, the elastic base substrate is a polyester base film.

Optionally, the color forming layer comprises a plurality of evenly distributed color forming units.

Optionally, each color forming unit comprises three color sacs: a first color sac, a second color sac, and a third color sac, which have a first pressure-bearing threshold, a second pressure-bearing threshold, and a third pressure-bearing threshold respectively; the first pressure-bearing threshold is smaller than the third pressure-bearing threshold, and the second pressure-bearing threshold is an average value of the first pressure-bearing threshold and the third pressure-bearing threshold.

Optionally, when the pressure borne reaches the first pressure-bearing threshold, the first color sac breaks to provide a first color; when the pressure borne reaches the second pressure-bearing threshold, the first and the second color sacs break to provide the first color and a second color respectively; when the pressure borne reaches the third pressure-bearing threshold, the first, the second, and the third color sacs all break to provide the first color, the second color, and a third color respectively.

Optionally, when the first color sac breaks, the color displaying layer displays the first color; when the first color sac and the second color sac break, the color displaying layer displays a mixed color of the first color and the second color; when the first color sac, the second color sac, and the third color sac all break, the color displaying layer displays a mixed color of the first color, the second color, and the third color.

Optionally, the first color, the second color, and the third color are red, green, and blue respectively.

In another aspect, the present disclosure also provides a manufacturing method of a pressure sensitive film, comprising:

providing a substrate, one surface of the substrate being used for bearing pressure;

forming a color displaying layer on the other surface of the substrate opposite to the surface for bearing pressure;

forming a color forming layer on the other surface of the color displaying layer opposite to the surface adjoining the substrate, the color forming layer comprising at least one color forming unit, each color forming unit comprising at least two color sacs; the at least two color sacs have pressure-bearing thresholds different from each other, and operate when the pressure borne reaches their respective pressure-bearing thresholds;

wherein the color displaying layer displays corresponding colors according to the operation conditions of the color sacs, each color corresponding to a set pressure value.

Optionally, the substrate is an elastic base film.

Optionally, the elastic base substrate is a polyester base film.

Optionally, the color forming layer comprises a plurality of evenly distributed color forming units.

Optionally, each color forming unit comprises three color sacs: a first color sac, a second color sac, and a third color sac, which have a first pressure-bearing threshold, a second pressure-bearing threshold, and a third pressure-bearing threshold respectively; the first pressure-bearing threshold is smaller than the third pressure-bearing threshold, and the second pressure-bearing threshold is an average value of the first pressure-bearing threshold and the third pressure-bearing threshold.

Optionally, when the pressure borne reaches the first pressure-bearing threshold, the first color sac breaks to provide a first color; when the pressure borne reaches the second pressure-bearing threshold, the first and the second color sacs break to provide the first color and a second color respectively; when the pressure borne reaches the third pressure-bearing threshold, the first, the second, and the third color sacs all break to provide the first color, the second color, and a third color respectively.

Optionally, when the first color sac breaks, the color displaying layer displays the first color; when the first color sac and the second color sac break, the color displaying layer displays a mixed color of the first color and the second color; when the first color sac, the second color sac, and the third color sac all break, the color displaying layer displays a mixed color of the first color, the second color, and the third color.

Optionally, the first color, the second color, and the third color are red, green, and blue respectively.

(III) Advantageous Effects

Embodiments of the present disclosure provides a pressure sensitive film and a manufacturing method thereof, and the pressure sensitive film may display different colors in different pressure ranges; by determining the device pressure range according to the different colors, effective monitoring on the device pressure is realized; the flatness of the device is determined by the evenness of colors of the tested regions, thus combining the pressure test and flatness test, and making routine device pressure monitoring more convenient.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

Figure 1:
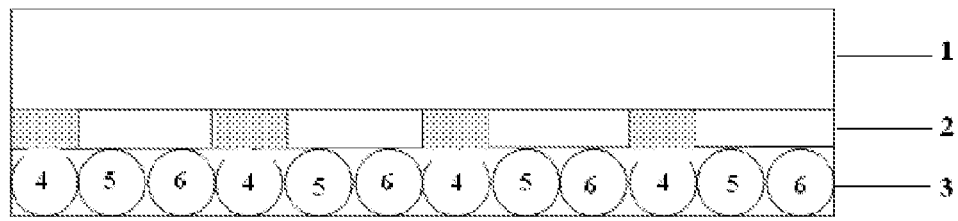
FIG. 1 is a structural schematic view of the pressure sensitive film of an embodiment of the present disclosure.
Figure 2:
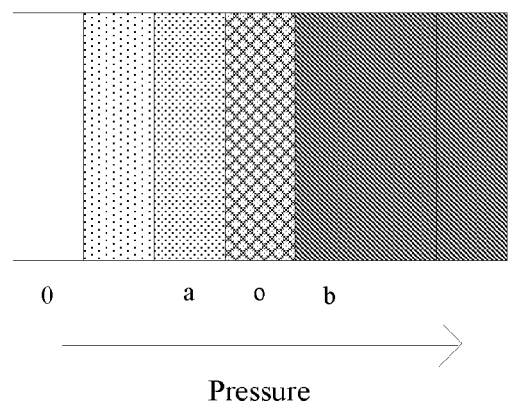
FIG. 2 is a schematic view of color changes of the pressure sensitive film of an embodiment of the present disclosure.

As shown in FIGS. 1-2, the present disclosure provides a pressure sensitive film, comprising a substrate 1, a color displaying layer 2, and a color forming layer 3 laminated sequentially;

the other surface of the substrate 1 opposite to the surface adjoining the color displaying layer 2 is for bearing pressure;

the color forming layer 3 comprises at least one color forming unit, and each color forming unit comprises at least two color sacs, and the at least two color sacs have pressure-bearing thresholds different from each other, and operate when the pressure borne reaches their respective pressure-bearing thresholds;

the color displaying layer 2 displays corresponding colors according to the operation conditions of the color sacs, and each color corresponds to a set pressure value.

For the pressure sensitive film provided by the embodiment of the present disclosure, the color displaying layer in the pressure sensitive film may display corresponding colors according to the operation conditions of the color sacs in different pressure-bearing ranges, realizing effective monitoring of the device pressure by determining the device pressure ranges according to the different colors; the flatness of the device is determined by the evenness of colors of the tested regions, thus combining the pressure test and flatness test, and making the routine device pressure monitoring more convenient.

Optionally, the substrate 1 is an elastic base film, which can bear device pressure and remain undeformed.

Therein, the elastic base film optionally uses a polyester base film. This material has very good elasticity and is economical. Of course, apart from using the polyester material to manufacture the base film, other materials having the same or similar properties to the polyester material may also be used.

The color forming layer comprises a plurality of evenly distributed color forming units; evenly setting a plurality of color forming units can improve the accuracy of detection of the flatness of the surface of the pressure sensitive film that the pressure applying device contacts.

In this embodiment, each color forming unit optionally comprises three color sacs: a first color sac 4, a second color sac 5, and a third color sac 6, which have a first pressure-bearing threshold A, a second pressure-bearing threshold O, and a third pressure-bearing threshold B respectively; the first pressure-bearing threshold is smaller than the third pressure-bearing threshold, and the second pressure-bearing threshold is the average value of the first pressure-bearing threshold and the third pressure-bearing threshold.

Therein, when the pressure on substrate 1 reaches the first pressure-bearing threshold A, the first color sac breaks to provide the first color; when the pressure on substrate 1 reaches the second pressure-bearing threshold O, the first color sac 4 and the second color sac 5 break to provide the first color and the second color respectively; when the pressure on substrate 1 reaches the third pressure-bearing threshold B, the first color sac 4, the second color sac 5, and the third color sac 6 all break to provide the first color, the second color, and the third color respectively.

Therein, when the first color sac 4 breaks, the color displaying layer 2 displays the first color; when the first color sac 4 and the second color sac 5 break, the color displaying layer 2 display a mixed color of the first color and the second color; when the first color sac 4, the second color sac 5, and the third color sac 6 all break, the color displaying layer 2 displays a mixed color of the first color, the second color, and the third color.

In practical operation, the three colors of the first color sac 4, the second color sac 5, and the third color sac 6 need to be designed as distinctively different colors, thus monitoring of the device pressure is realized by the color changes displayed on the pressure sensitive film.

In this embodiment, the first color, the second color, and the third color to which the first color sac 4, the second color sac 5, and the third color 6 correspond respectively are red, green and blue respectively.

Specifically, when the first color 4 breaks, the color displaying layer 2 displays red color a; when the first color sac 4 and the second color sac 5 break, the color displaying layer 2 displays a mixed color of yellow color o of red and green colors; when the first color sac 4, the second color sac 5, and the third color sac 6 all break, the color displaying layer 2 displays a mixed color of dark gray b of red, green and blue colors.

Setting the first color sac 4, the second color sac 5, and the third color sac 6 as red, green and blue colors may get a mixed color yellow of red and green colors, and a mixed color of dark gray of red, green and blue colors; thus the contrast of the colors is further increased, and it is easier to identify different pressure ranges, and effective monitoring of the device pressure is realized.

Of course, the specific colors of the first color sac 4, the second color sac 5, and the third color sac 6 can be set according to actual needs, as long as the colors of particles in the three color sacs and the colors of the mixed colors have great contrast.

With the pressure applied on the device increasing gradually, the color change trend of the pressure sensitive film is as shown in FIG. 2; the device pressure range is determined by the actual colors of the pressure sensitive film, and the device flatness is determined according to the evenness of the colors of the pressure sensitive film.

If the colors on the pressure sensitive film are similar to each other, it means that the values of the pressures applied on the device are close to each other, and thus it means that the flatness of the device is good; otherwise, it means that the device flatness is not good, i.e., the pressure value differences are great.

Figure 3:
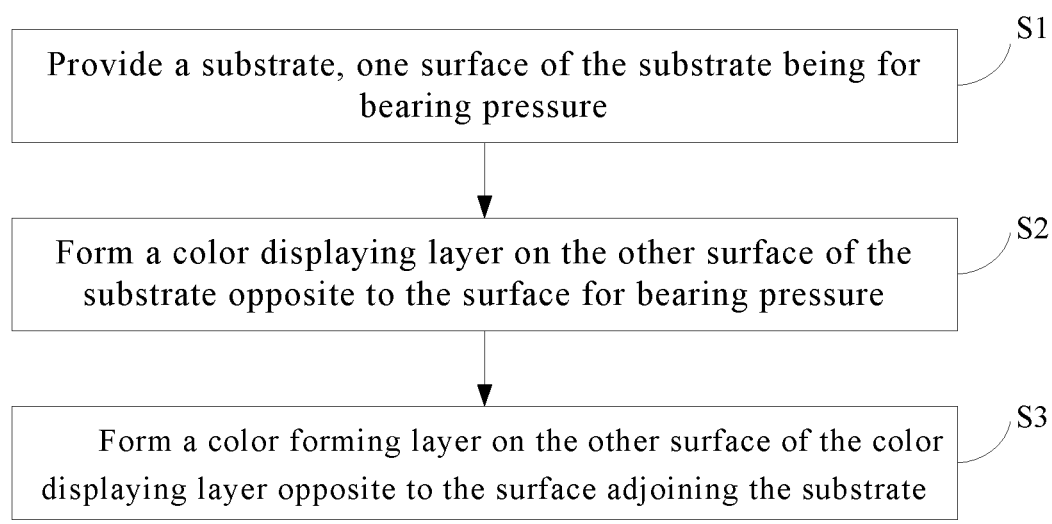
FIG. 3 is a flow chart of a manufacturing method of the pressure sensitive film of an embodiment of the present disclosure.

As shown in FIG. 3, the present disclosure also provides a manufacturing method of a pressure sensitive film, comprising:

Step S1: providing a substrate, a surface of the substrate being for bearing pressure;

Step S2; forming a color displaying layer on the other surface of the substrate opposite to the surface for bearing pressure;

Step S3: forming a color forming layer on the other surface of the color displaying layer opposite to the surface adjoining the substrate; the color forming layer comprises at least one color forming unit, each color forming unit comprises at least two color sacs, and the at least two color sacs have pressure-bearing thresholds different from each other, and they operate when the pressure borne reaches their respective pressure-bearing thresholds; wherein the color displaying layer displays corresponding colors according to the operation conditions of the color sacs, and each color corresponds to a set pressure value.

Optionally, the substrate is an elastic base film, and the elastic base film is a polyester base film.

The color forming layer comprises a plurality of evenly distributed color forming units, each color forming unit comprises three color sacs: a first color sac, a second color sac, and a third color sac, which have the first pressure-bearing threshold, a second pressure-bearing threshold, and a third pressuring-bearing threshold respectively; the first pressure-bearing threshold is smaller than the third pressure-bearing threshold, and the second pressure-bearing threshold is an average value of the first pressure-bearing threshold and the third pressure-bearing threshold. When the pressure borne reaches the first pressure-bearing threshold, the first color sac breaks to provide the first color. When the pressure borne reaches the second pressure-bearing threshold, the first color sac and the second color sac break to provide the first color and the second color respectively; when the pressure borne reaches the third pressure-bearing threshold, the first color sac, the second color sac and the third color sac all break to provide the first color, the second color and the third color. When the first color sac breaks, the color displaying layer displays the first color; when the first color sac and the second color sac break, the color displaying layer displays a mixed color of the first color and the second color; when the first color, the second color sac, and the third color sac all break, the color displaying layer displays a mixed color of the first color, the second color, and the third color.

Optionally, the first color, the second color, and the third color are red, green and blue, respectively.

Specifically, when the first color sac breaks, the color displaying layer displays red color a; when the first color sac and the second color sac break, the color displaying layer displays a mixed color of yellow o of red and green colors; when the first color sac, the second color sac, and the third color sac all break, the color displaying layer displays a mixed color of dark gray b of red, green, and blue colors.

Setting the first color sac 4, the second color sac 5, and the third color sac 6 as red, green, and blue colors can get a mixed color of yellow of red and green colors, and a mixed color of dark gray of red, green, and blue colors; and the color contrast is further increased, so it is easier to identify different pressure ranges and realize effective monitoring of the device pressure.

The present disclosure provides a manufacturing method of a pressure sensitive film, and the pressure sensitive film may display different colors in different pressure ranges; realizes effective monitoring of the device pressure by determining the device pressure range according to the different colors; determines the flatness of the device by the evenness of colors of the tested regions, combining the pressure test and flatness test, so as to make the routine device pressure monitoring more convenient.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A pressure sensitive film comprising:
    a substrate, a color displaying layer and a color forming layer laminated sequentially;
    the substrate including a pressure bearing surface opposite to the surface of the substrate adjoining the color displaying layer;
    the color forming layer comprising at least one color forming unit, each color forming unit comprising at least two color sacs, the at least two color sacs each having pressure-bearing thresholds different from each other, and operating when the pressure borne by the substrate reaches the respective pressure-bearing threshold of said color sac;
    the color displaying layer displaying corresponding colors according to operation conditions of the color sacs, and each color corresponding to a set pressure value.

2. The pressure sensitive film of claim 1, wherein the substrate is an elastic base film.

3. The pressure sensitive film of claim 2, wherein the elastic base film is a polyester base film.

4. The pressure sensitive film of claim 1, wherein the color forming layer comprises a plurality of evenly distributed color forming units including the at least one color forming unit.

5. The pressure sensitive film of claim 1, wherein:
each color forming unit comprises three color sacs: a first color sac, a second color sac, and a third color sac, which have a first pressure-bearing threshold, a second pressure-bearing threshold, and a third pressure-bearing threshold respectively; and
the first pressure-bearing threshold is smaller than the third pressure-bearing threshold, and the second pressure-bearing threshold is an average value of the first pressure-bearing threshold and the third pressure-bearing threshold.

6. The pressure sensitive film of claim 5, wherein:
when the pressure borne reaches the first pressure-bearing threshold, the first color sac breaks to provide a first color;
when the pressure borne reaches the second pressure-bearing threshold, the first and the second color sacs break to provide the first color and a second color respectively; and
when the pressure borne reaches the third pressure-bearing threshold, the first, the second, and the third color sacs all break to provide the first color, the second color, and a third color respectively.

7. The pressure sensitive film of claim 6, wherein:
when the first color sac breaks, the color displaying layer displays the first color;
when the first color sac and the second color sac break, the color displaying layer displays a mixed color of the first color and the second color; and
when the first color sac, the second color sac, and the third color sac all break, the color displaying layer displays a mixed color of the first color, the second color, and the third color.

8. The pressure sensitive film of claim 6, wherein the first color, the second color, and the third color are red, green, and blue respectively.

9. The pressure sensitive film of claim 7, wherein the first color, the second color, and the third color are red, green, and blue respectively.

10. A manufacturing method of a pressure sensitive film, the method comprising:
providing a substrate, one surface of the substrate being used for bearing pressure;
forming a color displaying layer on the other surface of the substrate opposite to the surface for bearing pressure; and
forming a color forming layer on a surface of the color displaying layer opposite to the surface of the color displaying layer adjoining the substrate, the color forming layer comprising at least one color forming unit, each color forming unit comprising at least two color sacs;
the at least two color sacs each having pressure-bearing thresholds different from each other, and operating when the pressure borne by the substrate reaches the respective pressure-bearing threshold of said color sac;
the color displaying layer displaying corresponding colors according to operation conditions of the color sacs, each color corresponding to a set pressure value.

11. The method of claim 10, wherein the substrate is an elastic base film.

12. The method of claim 11, wherein the elastic base film is a polyester base film.

13. The method of claim 10, wherein the color forming layer comprises a plurality of evenly distributed color forming units including the at least one color forming unit.

14. The method of claim 10, wherein:
each color forming unit comprises three color sacs: a first color sac, a second color sac, and a second color sac, which have a first pressure-bearing threshold, a second pressure-bearing threshold, and a third color-bearing threshold respectively; and
the first pressure-bearing threshold is smaller than the third pressure-bearing threshold, and the second pressure-bearing threshold is an average value of the first pressure-bearing threshold and the third pressure-bearing threshold.

15. The method of claim 14, wherein:
when the pressure borne reaches the first pressure-bearing threshold, the first color sac breaks to provide a first color;
when the pressure borne reaches the second pressure-bearing threshold, the first and the second color sacs break to provide the first color and a second color respectively; and
when the pressure borne reaches the third pressure-bearing threshold, the first, the second, and the third color sacs all break to provide the first color, the second color, and a third color respectively.

16. The method of claim 15, wherein:
when the first color sac breaks, the color displaying layer displays the first color;
when the first color sac and the second color sac break, the color displaying layer displays a mixed color of the first color and the second color; and
when the first color sac, the second color sac, and the third color sac all break, the color displaying layer displays a mixed color of the first color, the second color, and the third color.

17. The method of claim 15, wherein the first color, the second color, and the third color are red, green, and blue respectively.

18. The method of claim 16, wherein the first color, the second color, and the third color are red, green, and blue respectively.

* * * * *